(No Model.)
F. BECKER.
ORNAMENTAL CHAIN.
No. 276,338.      Patented Apr. 24, 1883.
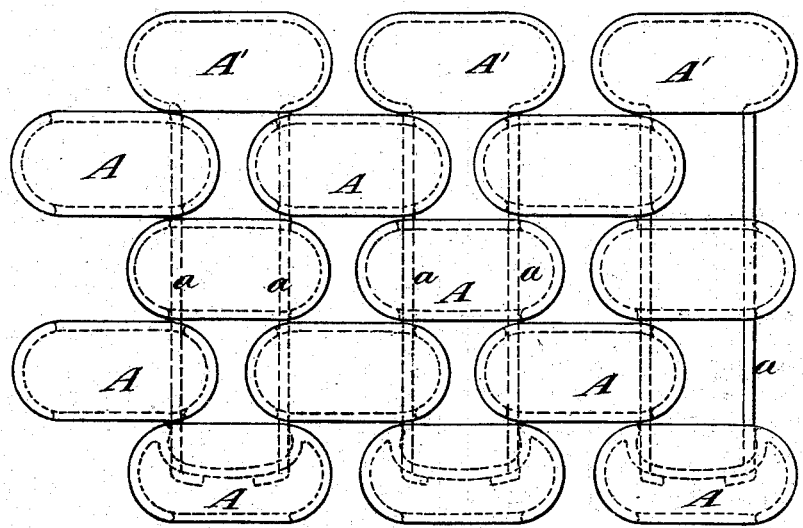
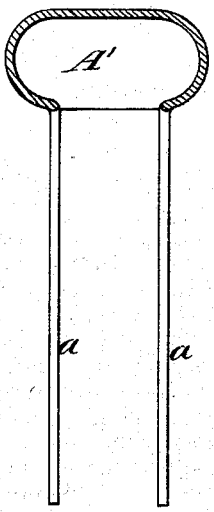
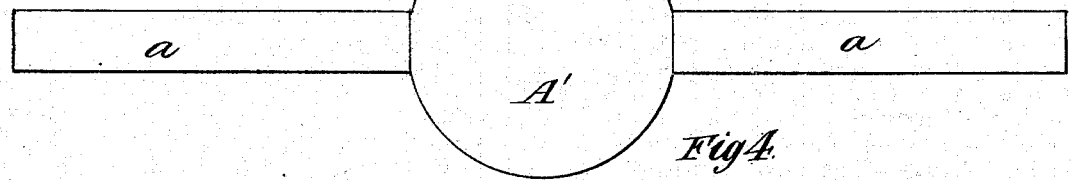
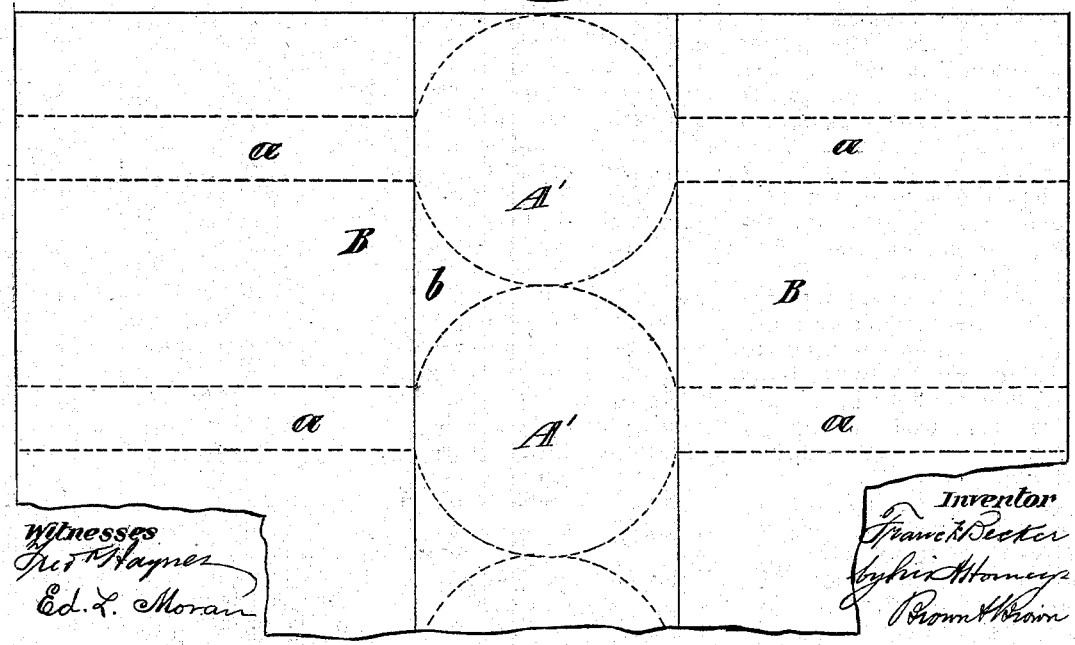

UNITED STATES PATENT OFFICE.

FRANCK BECKER, OF ATTLEBOROUGH FALLS, MASS., ASSIGNOR TO ROBERT F. SIMMONS, EDGAR L. HIXON, AND JOSEPH L. SWEET, OF SAME PLACE.

ORNAMENTAL CHAIN.

SPECIFICATION forming part of Letters Patent No. 276,338, dated April 24, 1883.

Application filed March 10, 1883. (No model.)

*To all whom it may concern:*

Be it known that I, FRANCK BECKER, of Attleborough Falls, Bristol county, in the State of Massachusetts, have invented a new and useful Improvement in Ornamental Chains, of which the following is a specification.

My improvement relates to flat ornamental or jewelry chains which are composed of small rings or beads arranged in rows transversely across the chain, the rings or beads in adjacent rows being made to overlap and pins inserted through the lapping portions of adjacent rows, and thereby securing the rings or beads together.

The invention consists in the combination, with the beads in a flat bead chain, of pins made integral with the outside beads, which form one edge of the chain, and projecting from said outside beads through the other beads. The outside beads form a finished edge for the chain, and they also constitute the pin-heads.

The invention also consists in the combination, with the beads of a flat bead chain, of pairs of pins projecting from the several beads on one outside edge of the chain, and extending transversely to the chain through the several rows of beads. The outside beads and their attached pins may be advantageously made of sheet metal by cutting from a strip a small disk with prongs extending in opposite directions, and then stamping or cupping the disk to form the bead, and thereby bringing the prongs into parallel positions, so that they will constitute the pins; and this process of producing the outside beads and pins is a feature of my invention.

The metal strip above described may be of brass, and preferably has a thin strip of gold soldered to its middle portion, from which the disks which form the beads are cut.

The hollow or cup-shaped bead having the pins projecting from the edge, as formed by the process above described, is also a feature of my invention.

In the accompanying drawings, Figure 1 represents a portion of a chain embodying my invention upon a greatly enlarged scale. Fig. 2 represents a sectional view of one of the outside beads and its pins. Fig. 3 represents a blank for making one of the beads and its pins, and Fig. 4 represents a metal strip from which the blanks for the outside beads are cut.

Similar letters of reference designate corresponding parts in all the figures.

Referring first to Fig. 1, A designates the beads or small rings of which the chain is principally composed, and A' designates the beads which form one outside edge of the chain. The beads are arranged in rows transversely across the chain, and beads of adjacent rows overlap each other. The beads are all secured together by pins a, which are formed integral with the outside beads, A', and extend therefrom in a direction across the chain through the lapping rows of beads. The pins project from each outside bead and secure to one row of beads the two adjacent rows on opposite sides thereof. These outside beads, with their pins, may be made in various ways. I may, for example, produce them from thin sheet metal, as here shown. The outside bead, A', itself is cup-shaped, as shown in Fig. 2, and the pins a project from the edge at opposite points.

The method of producing the outside beads is best shown in Figs. 3 and 4. I take a strip of base metal, B, and to the middle portion thereof I solder a thin strip of gold, b, sufficiently wide to form the bead itself. From this strip I cut by means of suitable dies the blanks, which consist of disks taken from the portion covered with gold and prongs extending in opposite directions therefrom. By the same operation and the use of a punch of suitable form I stamp or cup the disks to bring them to the form of the bead A', (shown in Fig. 2,) and to turn the prongs into parallel positions to form the pins a. The inner beads, A, of the chain may be produced in the usual way. After the pins a have been inserted through the beads A their ends may be riveted or turned over to secure them, and the outside beads on the edge of the chain opposite the beads A' may have caps soldered or secured to them for covering the turned-over or riveted ends of the pins.

The beads A' impart a finished appearance to one edge of the chain, and I contemplate filing an application for Letters Patent covering means whereby a finished edge may be produced on the other side.

What I claim as my invention, and desire to secure by Letters Patent, is—

1. The combination, with the beads of a flat bead chain, of pins made integral with the outside beads, which form one edge of the chain, and projecting from said outside beads through the other beads, substantially as specified.

2. The combination, with the beads of a flat bead chain, of a pair of pins formed integral with each outside bead on one edge of the chain, and extending through the other beads of the chain, substantially as specified.

3. The process of making a bead having integral pins, consisting in cutting from sheet metal a disk with prongs or pins extending in opposite directions, and in stamping or cupping the disk to form the bead and bring the prongs or pins into parallel positions, substantially as specified.

4. The process of making a bead having integral pins, consisting in taking a strip of metal of a width sufficient to produce a blank for the same, in soldering to the middle portion of such strip a thin plate of gold sufficiently wide to form the blank for the bead, in cutting the blank from the strip, and stamping or cupping it to form the bead and to bring the pins into parallel positions, substantially as specified.

5. The combination, with the beads A, of the outside beads, A', formed of sheet metal stamped into concave form, and provided with integral pins $a$, extending from their edges through the beads A, substantially as specified.

FRANCK BECKER.

Witnesses:
 FRED B. BYRAM,
 EDGAR L. HIXON.